US008877273B2

(12) United States Patent
Padan et al.

(10) Patent No.: US 8,877,273 B2
(45) Date of Patent: Nov. 4, 2014

(54) DEVICE AND METHOD FOR EXTRACTING OLIVE OIL

(75) Inventors: Nir Padan, Moshav Sde Itzhak (IL); Yariv Gershony, Hod Haharon (IL); Eric Turgeman, Rishpon (IL)

(73) Assignee: Olive X-Press Ltd., Hod-Hasharon (IL)

( * ) Notice: Subject to any disclaimer, the term of this patent is extended or adjusted under 35 U.S.C. 154(b) by 176 days.

(21) Appl. No.: 12/865,898

(22) PCT Filed: Jun. 4, 2009

(86) PCT No.: PCT/IL2009/000564
§ 371 (c)(1),
(2), (4) Date: Nov. 8, 2010

(87) PCT Pub. No.: WO2010/007610
PCT Pub. Date: Jan. 21, 2010

(65) Prior Publication Data
US 2011/0045151 A1 Feb. 24, 2011

Related U.S. Application Data

(60) Provisional application No. 61/074,642, filed on Jun. 22, 2008.

(51) Int. Cl.
*A23C 15/14* (2006.01)
*A23J 1/00* (2006.01)
*C11B 1/06* (2006.01)

(52) U.S. Cl.
CPC .................................... *C11B 1/06* (2013.01)
USPC ........................................ 426/417; 99/501

(58) Field of Classification Search
CPC .................................................... C11B 1/06
USPC .................................................... 426/417
See application file for complete search history.

(56) References Cited

U.S. PATENT DOCUMENTS

| | | | | |
|---|---|---|---|---|
| 1,045,039 | A * | 11/1912 | Kisic | 74/16 |
| 4,852,814 | A * | 8/1989 | Amiot et al. | 241/37.5 |
| 6,338,865 | B1 | 1/2002 | Van Putte | |
| 2003/0207007 | A1* | 11/2003 | Maitland et al. | 426/417 |
| 2006/0065133 | A1* | 3/2006 | Moline | 99/511 |
| 2006/0191425 | A1* | 8/2006 | Chang | 99/511 |

FOREIGN PATENT DOCUMENTS

| | | | | |
|---|---|---|---|---|
| FR | 1260203 | A | * | 3/1960 |
| FR | 1 260 203 | | | 5/1961 |
| GB | 10924 | | | 0/1912 |
| IT | RM 950 298 | | | 11/1996 |
| IT | RM950298 | A1 | * | 11/1996 |
| WO | WO99/61568 | | * | 12/1999 |
| WO | WO 99/61568 | | | 12/1999 |

* cited by examiner

*Primary Examiner* — Humera Sheikh
*Assistant Examiner* — Subbalakshmi Prakash
(74) *Attorney, Agent, or Firm* — Soroker-Agmon

(57) ABSTRACT

A device for extracting oil, the oil extracting device comprising: a hammer-shear olive milling grinder, a malaxation bowl for malaxation of milled olives having at least one opening; at least one filter for separating malaxation solids from liquids, said filter is located within said opening. The device is especially adapted to home users and can be placed on a counter, such as a kitchen counter. The subject matter further includes a process for obtaining olive oil, comprising the steps of malaxation of milled olives in a malaxation bowl, the malaxation bowl comprising at least one filter configured for separating solids from liquids and collecting oil.

18 Claims, 7 Drawing Sheets

SECTION A–A

SECTION C–C

SECTION A–A

SECTION A-A

DETAIL B
SCALE 1:1

DEVICE AND METHOD FOR EXTRACTING OLIVE OIL

FIELD OF THE INVENTION

The present invention relates generally to a device and method for use for producing olive oil.

BACKGROUND OF THE INVENTION

Olive oil extraction is the process of extracting the oil present in the olive drupes for food use. The oil is produced in the mesocarp cells, and stored in a particular type of vacuole called a lipovacuole. Every cell contains a tiny olive oil droplet. Olive oil extraction is the process of separating the oil from the other fruit contents. After washing the olives different known techniques may be employed for extracting oil. Traditional methods typically press the olive using a grinder with two millstones. First the olives are ground into an olive paste using large millstones. The olive paste is generally ground by the stones for 30 to 40 minutes for guaranteeing that the olives are well ground and for allowing the fruit enzymes to produce some of the oil aromas and taste. After grinding, the olive paste is spread on fiber disks, which are stacked on top of each other, then placed into a press. These disks are then put on a hydraulic piston, forming a pile. Pressure is applied on the disks, thus compacting the solid phase of the olive paste and percolating the liquid phases. To facilitate separation of the liquid phases, water flows on the sides of the disks to increase the speed of percolation. The liquids are then separated either by a standard process of decantation by gravity or by means of a faster vertical centrifuge. The traditional method provides good results and high quality of oil, although the machine is rather difficult to clean. It is a non continuous process with waiting periods thus exposing the olive paste to the action of oxygen and light. This method typically requires additional manual labor and a longer time period from harvest to pressing as compared to other methods for producing olive oil.

Modern methods of olive oil extraction use an industrial decanter to separate all the phases by centrifugation. In this method the olives are first crushed to a fine paste. This can be done by a hammer crusher, disc crusher or knife crusher. The paste is then malaxed for 30 to 40 minutes in order to allow the small olive droplets to agglomerate. The aromas are created in these two steps through the action of fruit enzymes. Water is added to facilitate the extraction process with the paste during malaxation. Typically the added water is heated in order to produce higher extraction percentage of olive oil. However, water temperatures above 35 degrees Celsius adversely affect the quality of the produced oil. Afterwards the paste is pumped into an industrial decanter where the phases are separated. The decanter is a large capacity horizontal centrifuge rotating at approximately 3000 rpm. The high centrifugal force created allows the phases to be readily separated according to their different densities (solids>vegetable water>oil). Although this technique is continuous and automatic providing high percentages of oil extraction it still produces large amounts of vegetable water to be disposed of and a reduced amount of antioxidants due to the added water.

Yet another known method for extracting oil, also know as "Sinolea" is a process which employs rows of metal discs or plates which are dipped into the paste. The oil preferentially wets and sticks to the metal and is removed with scrapers in a continuous process. The method is based on the different surface tension of the vegetable water and the oil; these different physical behaviors allow the olive oil to adhere to the steel surface while the other two phases stay behind. However large surface areas can lead to rapid oxidation of the olive product. In addition, the cleaning process of the surfaces is difficult and time consuming.

All above methods are designed for large scale industrial press applications and for handling of large quantities of olives and oil.

There is hence a long need for a system and method for extracting oil which may also be used as a house hold countertop appliance. Such desired method may not require any additives nor trained personnel.

SUMMARY OF THE INVENTION

An aspect of an embodiment of the invention relates to a device and method for extracting olive oil The subject matter discloses a device for extracting oil, the oil extracting device comprising: a malaxation bowl (100) for malaxation of milled olives having at least one opening; and at least one filter (130) located within said at least one opening for separating solids from liquids.

In some embodiments, the device further comprises a crushing device for crushing the olives. In some embodiments, the at least one filter is made of a material selected from a group consisting of stainless steel, polymer mesh configured for allowing liquids to pass through while holding back solids or a combination thereof. In some embodiments, the at least one filter is located on the wall of the malaxation bowl, at the expected oil level.

In some embodiments, the device further comprises a barrier to prevent from malaxation liquids to pass through the at least one filter, said barrier is located between the malaxation bowl and the at least one filter. In some embodiments, the device further comprises a collecting bowl for collecting the malaxation liquids, the malaxation bowl is located such that oil flowing from the at least one filters is collected within said collecting bowl.

In some embodiments, the collecting bowl has a volume for maintaining sediments. In some embodiments, the collecting bowl is positioned adjacent to the malaxation bowl, receiving flow from the malaxation bowl through the at least one filter. In some embodiments, the device further comprises a spout, having an inner opening; said inner opening is positioned at about the oil level.

In some embodiments, the spout further comprises a valve for regulating the height of the inner opening of the spout. In some embodiments, the spout further comprises a valve core located adjacent to the collecting bowl and having a hollow cylinder having a longitudinal cut substantially across the length of the valve core.

In some embodiments, the at least one filter is having a filter body and the at least one filter is further comprising a frame for supporting the filter body. In some embodiments, the filter body further comprises an element for attaching a barrier for enabling partial blockage of liquid flow exiting the malaxation bowl. In some embodiments, the at least one filter is detachable.

In some embodiments, the malaxation bowl has external circumference sockets compatible in size, shape and position to inner circumference protrusions integrated as part of the inner surface of the collecting bowl.

In some embodiments, the device further comprises at least one barrier attached to said collecting bowl. In some embodiments, the device further comprises a filtering element residing between the collecting bowl and a receiving container for controlling the amount of sediment flowing into the receiving container. In some embodiments, the device enables a user to control the oil's appearance or quality.

It is another object of the subject matter to disclose a method for obtaining olive oil, the process comprising the steps of malaxation of milled olives in a malaxation bowl, the malaxation bowl comprising at least one filter configured for separating solids from liquids; and collecting oil flowing through said at least one filter. In some embodiments, the method further comprises milling the olives in a hammer-shear grinder. In some embodiments, the method further comprises limiting the flow of liquids through the filter through the introduction of a barrier partially blocking said at least one filter.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with a same or similar number in all the figures in which they appear, wherein:

FIGS. 3*c* and 3*d* are cross sectional views of FIGS. 2*a* and 3*b*, respectively of the device in open position, according to an embodiment of the subject matter;

DETAILED DESCRIPTION OF THE PREFERRED EMBODIMENTS

Figure 1A:
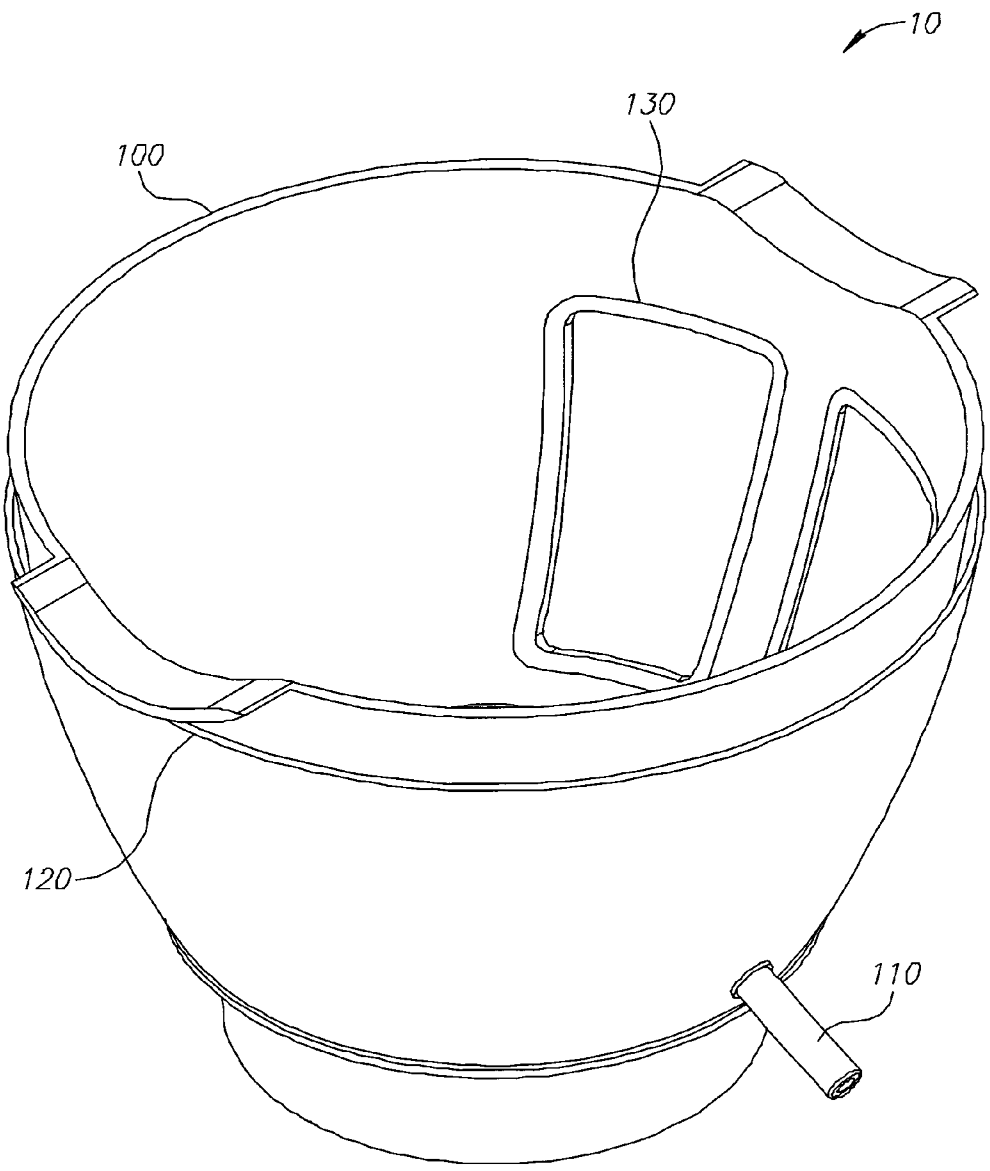
FIG. 1*a* illustrates a first configuration of an oil extracting device, according to an embodiment of the invention.

The present invention relates to a system and method for extracting olive oil. The principles and operation of a system and method involving the extraction of olive oil, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Further, where considered appropriate, reference numerals may be repeated among the figures to indicate corresponding or analogous elements.

Reference is made to FIG. 1*a*, a top view of a first configuration of an oil extracting device (10) including a malaxation bowl (100) designed for malaxation. The malaxation bowl (100) includes one or more openings designed to receive one or more filters (130). According to some embodiments of the subject matter the malaxation bowl can be fabricated with the one or more filters (130) integrated therein or snapped on before use. Other embodiments of the subject matter can include any shape container to be used as the malaxation bowl. The malaxation stage is a process of olive oil extraction. In other words, it is a process of churning or mixing milled olives in a specially designed mixer or container for approximately 20 to 60 minutes. The malaxation allows the smaller droplets of oil to aggregate and be easily separated and released from the olive paste. The paste may be heated to between 25° C. and 30° C. during this process. In some embodiments, the paste may be heated during all or a portion of the stages of the malaxation to any temperature under 35° C.

After malaxation, one or more filters (130) located in or connected to a wall of the malaxation bowl (100), for allowing flow, regulated by the height of the filter position on the malaxation bowl wall. Such one or more filters allow mainly the flow of lighter substances, primarily oil, from the malaxation bowl. The process of primarily separating the oil from the other ingredients within the malaxation bowl (100) occurs through the natural flow of oil generated during the process of malaxation via the one or more filters (130). In some exemplary embodiments of the subject matter, the one or more filters (130) are located in the openings of the malaxation bowl. Said one or more filters (130) can typically be made of stainless steel or polymer mesh allowing liquids and small sediments to pass through while holding back solids or any other filter known to the person skilled in the art. In other exemplary embodiments of the subject matter, the malaxation bowl (100) can comprise one or more openings (not shown) into which the one or more filters (130) are affixed. Alternatively, such one or more filters (130) can be placed into openings of the malaxation bowl (100) during the process of manufacture of the malaxation bowl (100).

Typically, after a period of time during which the ingredients are mounted in the malaxation bowl (100), the oil floats above the other ingredients extracted from the olive due to its lower specific weight, hence the position of the filters should be at substantially the oil level. In some embodiments of the subject matter, access to the one or more filters (130) can be blocked during malaxation through the use of a wall or other barrier (not shown) which prevents from oil to flow through the one or more filters (130). After the liquids have flowed via the one or more filters (130), they are transferred into a collecting bowl (120) which collects the liquids and some small sediments extracted from the olives. Such liquid is preferably oil extracted from the olives. The collecting bowl (120) can be a bowl into which the malaxation bowl (100) is inserted, such that the malaxation bowl (100) is located within said collecting bowl (120). In some embodiments, the collecting bowl (120) can be shaped as a fluid collection sump having sufficient collecting area to allow for accumulation of oil and sediment. In other embodiments of the subject matter the collecting bowl (120) can be of any type of a collection plate or surface having a depth to allow for accumulation of oil or oil and sediment flowing through the one or more filters (130).

In operation, after malaxation the oil and at times oil and sediment will flow into the collecting bowl (120). Since the collecting bowl (120) has sufficient depth which in some embodiments lies in the range between about 2 cm to about 50 cm) sediment will settle at the bottom of the collecting bowl (120) and oil will float on top of said sediment. The collecting bowl (120) can be affixed to the malaxation bowl (100) through the use of any known affixing agent such as glue, welding, riveting and the like. In other embodiments of the subject matter, the collecting bowl (120) can be prefabricated with the malaxation bowl (100) such that they form a single unit. The collecting bowl (120) can in other embodiments comprise a collecting rim having a depth (not shown) affixed to the malaxation bowl below the lower one or more filters (130) line. In yet other embodiments, the collecting bowl (120) can be a second collecting container located below the malaxation bowl (100). Oil and other sediment flowing through the one or more filters (130) are accumulated in the collecting bowl (120). The collecting bowl (120) can also comprise an exiting spout (110) positioned so as to transfer oil to yet another collecting container (not shown), leaving the sediments and unwanted liquids in a volume created within the collection bowl (120) below the exiting spout (110). Since the oil is lighter than the sediments and the vegetable water, it is preferred to position the inner opening of the exiting spout (110) at about the oil level, thus avoiding sediments and unwanted liquids from exiting the collecting bowl (120). The term oil level in the context of the present invention refers to the height of oil achieved after at least a portion of the malaxation. Said oil level may be determined before the step of malaxation as a function of the parameters such as quantity, ingredients, olive cultivar, size of malaxation bowl (100) and the like. In some cases, at least a portion of the barriers (not shown) are left closed to prevent flow of non-oil fluids from the malaxation bowl (100). Control of the barriers (not shown) may preferably be performed using one or more chemical detectors.

Since each olive cultivar is likely to produce a different oil level, depending on the amount of oil present in the olives and other characteristics of the particular olive cultivar, the exiting spout (110) may be in a permanent position as shown in FIG. 1*a* or may have a mechanism (not shown) allowing an altering of its position such that additional sediment will not be collected within said spout (110). Such mechanism can include for example a mechanical track (not shown) allowing the movement of the exiting spout (110) along the vertical axis to allow moving the exiting spout (110) up and down to different levels and allowing extraction of the maximum amount of oil without sediment per each cultivar of olive. To allow the user to place the spout at the right height, marking lines (not shown) indicating the best oil level for each cultivar of olive and olive quantity can be displayed on the outside surface of the collecting bowl (120). In some embodiments of the subject matter, the malaxation bowl (100) and the collecting bowl (120) have similar dimensions; the collecting bowl is slightly larger as compared to the malaxation bowl, allowing a gap of approximately 1-5 mm between both bowls. In some other embodiments of the subject matter, the device (10) further comprises a receiving container (not shown) that receives the oil from the collecting bowl (120) via connecting element such as a pipe, tube or pump. A filtering element may reside between the receiving container and the collecting bowl (120) for allowing the user to control the level of filtering, hence control the oil's level and color.

Figure 1B:
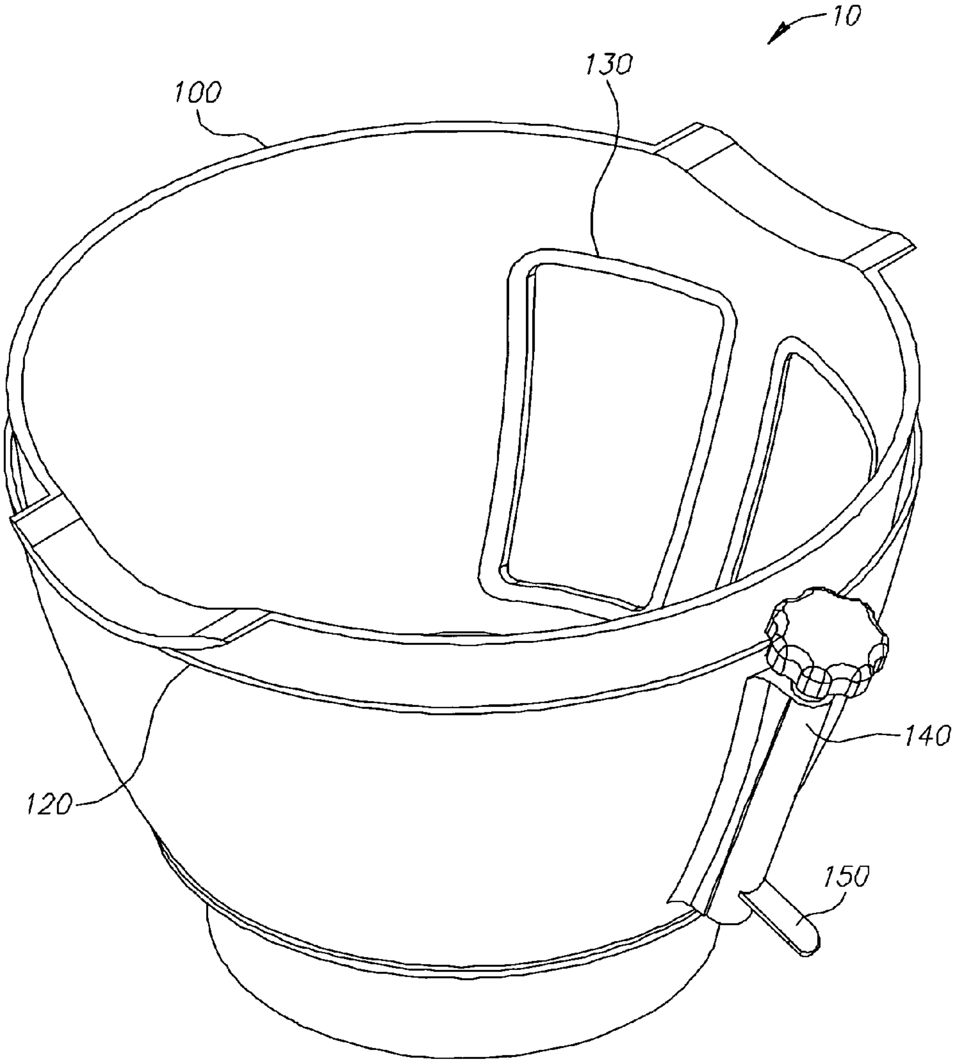
FIG. 1*b* illustrates a second configuration of an oil extracting device having a designed valve for controlling a vertical spout through which oil exits the collecting bowl, according to an embodiment of the invention.

Reference is made to FIG. 1*b*, depicting a second configuration of an oil extracting device (10) having a designed valve (140) and an exiting spout (150) through which oil exits the collecting bowl (120). The designed valve (140) diameter is between 3-10 mm. The valve is designed so that the opening height is proportional to the rotation angle. More specifically, the position of the valve sets the height of the inner opening of the spout (150) and there from its selectivity of the exiting material as described in detail in reference made to FIG. 1*c*. In the present invention it is preferred to have an inner spout opening which is set at the oil level, capable of allowing the exit of high percentages of oil and leaving the sediments and undesired liquids in the volume created within the collecting bowl (120) below the inner opening of the spout (150). The second configuration also includes the one or more filters (130) and the malaxation bowl (100) which are similar to the first configuration of the oil-extracting device (10) described in reference made to FIG. 1*a*.

Figure 1D:
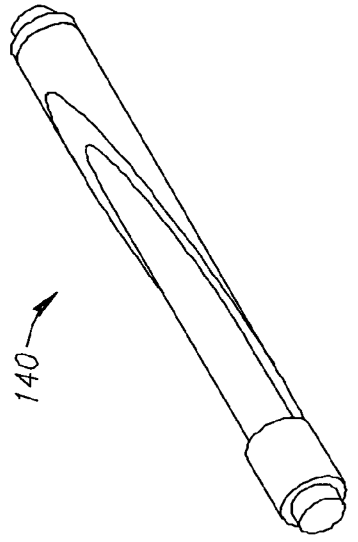
FIG. 1*d* illustrates the valve core of the designed valve shown in FIGS. 1*b* and 1*c*, according to an embodiment of the invention.
Figure 1C:
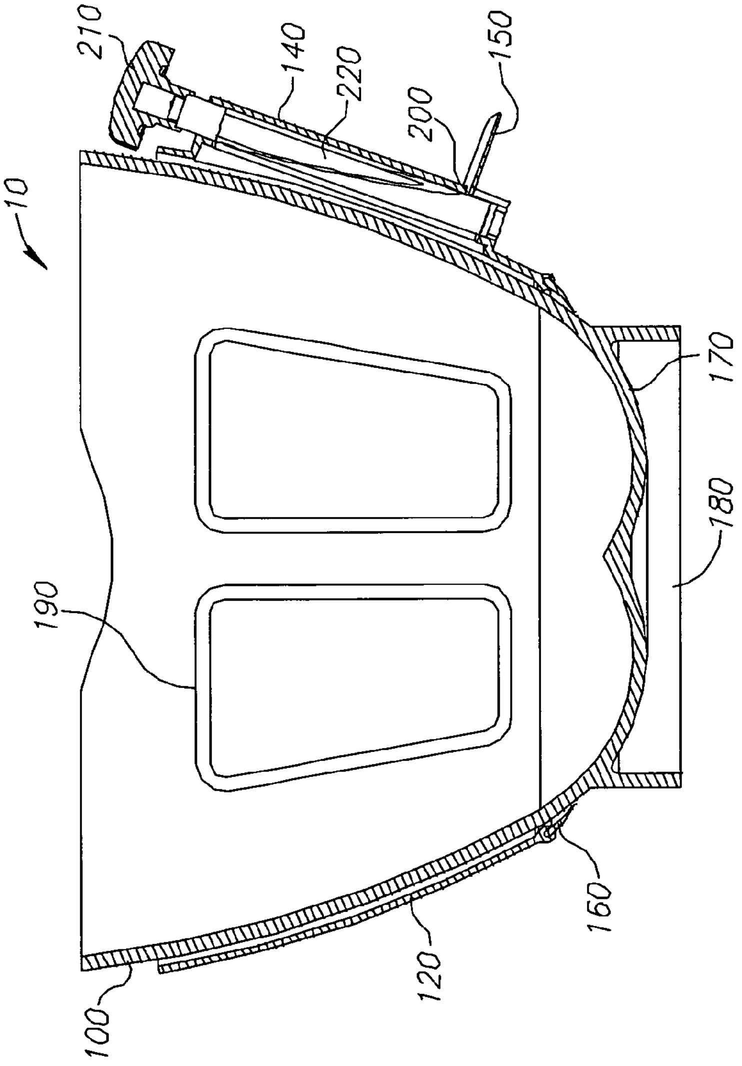
FIG. 1*c* is a cross sectional view of the oil extraction device of FIG. 1*b*, according to an embodiment of the invention.

Reference is made to FIG. 1*c*, which is a cross-sectional view of the oil extracting device (10) of FIG. 1*b*. The oil extracting device (10) comprises the malaxation bowl (100) mechanically attached to the collecting bowl (120) by a connecting element (160) such as lip sealing, welding, glue, over-mould, insert-mould and the like, so that the volume between the malaxation bowl (100) and the collecting bowl (120) is between 200 ml to 500 ml. The designed valve (140) described in reference made to FIG. 1*b* is designed so that the opening level (200) is proportional to the rotation angle of a knob (210) which sets accordingly the position of the proportional valve body (220) and there from sets the opening level through which oil will flow out while sediments and unwanted liquids are kept behind. The base (180) of the malaxation bowl (100) and lower surface (170) of said malaxation bowl (100) are required to stabilize said bowl and to maintain it level to properly determine the height of the oil level.

Reference is made to FIG. 1*d*, a magnified illustration of the valve core (140). As previously described the valve is designed so that the opening level is proportional to the rotation angle. More specifically, the position of the valve sets the height of the inner opening of the exiting spout and there from its selectivity of the exiting material. As can be readily seen the valve core is a hollow cylinder with a diagonal cut through the core such that turning the valve core would change the height of the opening facing the collecting bowl (120).

Figure 2D:
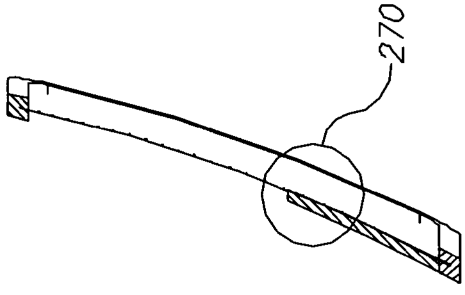
FIGS. 2*c* and 2*d* are cross sectional views of the filter taken along lines C-C and A-A of FIG. 2*b*, respectively according to an embodiment of the subject matter.
Figure 2C:
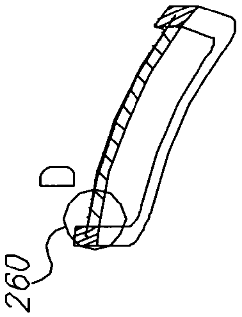
Figure 2B:
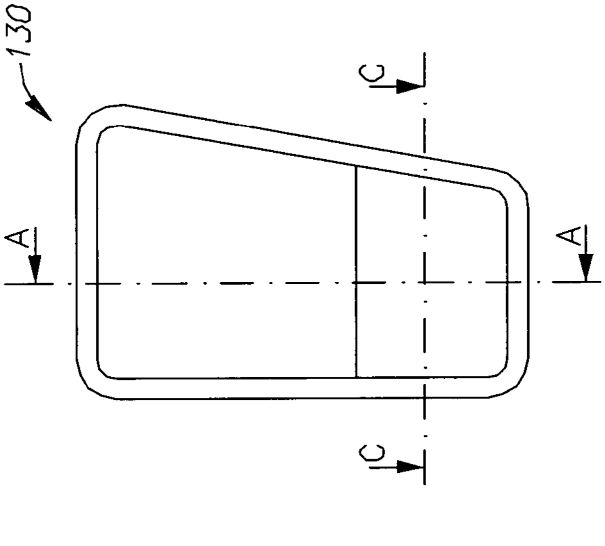
FIG. 2*b* is a cross-section view of the filter of FIG. 2*a*, according to an embodiment of the invention.
Figure 2A:
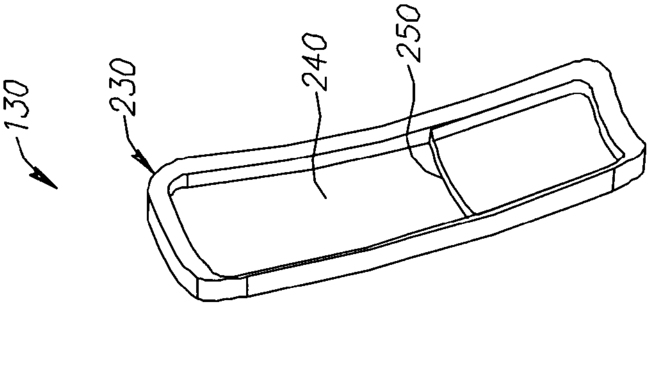
FIG. 2*a* illustrates a filter integrated in the malaxation bowl, according to an embodiment of the invention.

Reference is made to FIG. 2*a*, illustrating a filter (130) integrated in, or detachably affixed into openings of, the malaxation bowl (100 of FIG. 1*a*). Filter (130) includes a frame (230) preferably made of polymer for supporting a filter body (240). The frame (230) may include elements for attaching a barrier (250) enabling partial blocking of liquid flow exiting the malaxation bowl. The barrier (250) may be of different sizes according to olive cultivars. The barrier (250) may be made of polymer or other like materials and can be supported to the filter frame through a mechanism comprising a fixed or moveable arm to allow for manual or controlled opening and closing of the barrier (250) by the user or through an automated mechanism such as a mechanism having a motor (not shown) attached to the arm (not shown). Barriers (250) may control the level of the liquids exiting the malaxation bowl (100). It is also optional to supply detachable filters (such as filters 130 of FIG. 1*a*), each one suitable for a predetermined olive cultivar, such that when the detachable filters are attached to the integrated frame (i.e. the frame integrated within the malaxation bowl), they set a different flowing level.

Another embodiment can be a filter (130) with a gradient of mesh pore size and hydrophobic properties (not shown) from bottom to top, with small pores at the bottom and larger pores at the top. This could be achieved by the filter (130) being comprised of a few separate mesh sections placed one above the other, separated by polymer bands or separators. In another embodiment, said gradient could be achieved by multiple layers of mesh combined to form the desired gradient.

There are several factors for extracting olive oil. Two significant ones which can be estimated and controlled are the amount of olives and the olive cultivar. Each combination provides a different type of olive oil in a different amount. Hence, setting optimal combinations for a user is preferred and can be accomplished by providing the user with appropriate sizes of filters as is described.

In some embodiments of the subject matter, the volume of the malaxation bowl (100) is approximately between 2-6 liters and the one or more filters (130) cover between 20%-60% of the surface area of the malaxation bowl (100). In some preferred embodiments of the subject matter, the volume of the malaxation bowl (100) is approximately between 2-5 liters and the one or more filters (130) cover between 30%-50% of the surface area of the malaxation bowl.

Figure 3B:
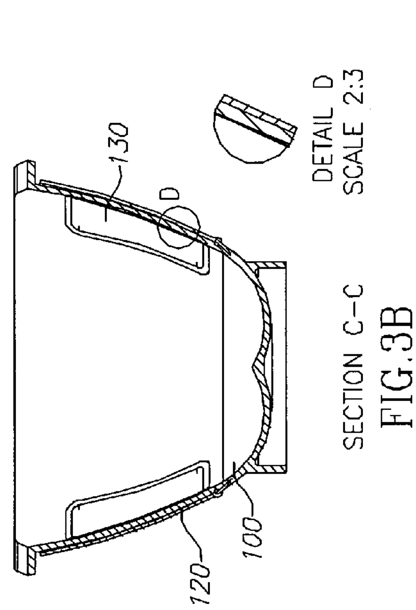
FIGS. 3*a* through 3*d* illustrate a third configuration of an oil extracting device having a mechanism for blocking and unblocking the filters, according to an embodiment of the subject matter.
Figure 3D:
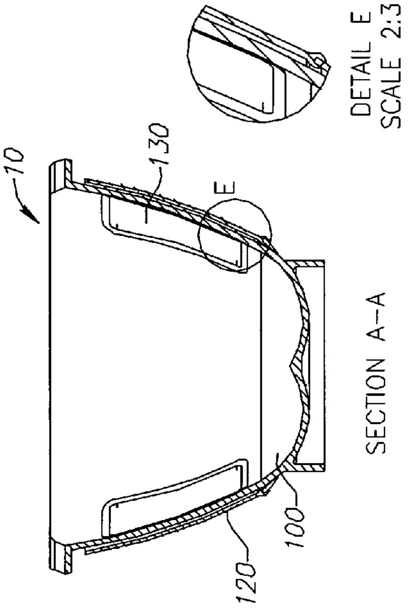
Figure 3A:
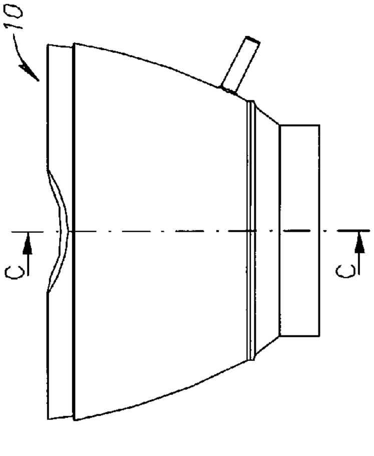

Reference is now made to FIGS. 3*a* and 3*b*, illustrating an embodiment of an oil extracting device (10) capable of blocking the one or more filters (130) during the malaxation process and also before and after the malaxation process by a mechanical or electrical feature. One embodiment of the oil extracting device illustrates the malaxation bowl (100) having a mechanism that controls the flow from the malaxation bowl to the collection bowl (120). Such mechanism may comprise a valve or control unit for opening or closing the filters, or a mechanism that moves at least one of the malaxation bowl (100) or collection bowl (120) in order to change the volume between said two bowls.

The oil extracting device (10) further includes the one or more filters (130) for allowing the flow of liquids, primarily oil, and fine sediments after malaxation. The malaxation bowl (100) may be in an open position wherein the one or more filters (130) are activated, in a closed position wherein the one or more filters (130) are made ineffective or in semi-open positions. It is preferred to activate an opening position or a semi-opening position of the malaxation bowl (100) after the malaxation process is completed to allow liquids to be transferred to the collecting bowl (120). In some embodiments of the subject matter it is preferred that the malaxation bowl (100) remains in a closed position throughout the malaxation process. In some embodiments of the present invention, the malaxation bowl (100) and the collecting bowl (120) are connected at the base by means of a rotating wheel or a sprocket which allows the rotation of the collecting bowl (120) around the malaxation bowl (100). According to this embodiment one or more barriers are connected to the connecting bowl (120) base and are situated such that in one position the barriers face the one or more filters (130) to block flow of material from the malaxation bowl (100) to the collecting bowl (120). When the collecting bowl (120) is rotated around the stationary malaxation bowl (100) the barriers attached to the collecting bowl (120) move accordingly allowing material to flow through the one or more filters (130). In other embodiments of the present invention the closed position merely comprise the positioning of barriers opposing the filters therefore substantially or completely blocking the flow of material from the malaxation bowl to the collecting bowl (120).

Figure 3C:
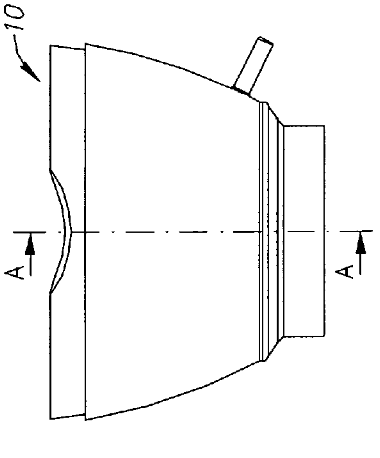

FIGS. 3*c*, and 3*d*, illustrate the oil extracting device (10) in an open position. In this position the gap between the malaxation bowl (100) and the collecting bowl (120) opens as the bowls spin around each other and the protrusions of the collecting bowl are no longer housed in their compatible sockets and inevitably push the collecting bowl (120) apart from the malaxation bowl (100), thereby activating or exposing the one or more filters (130) and allowing liquid to be transferred between the malaxation bowl (100) and the collecting bowl (120) via the one or more filters (130).

Figure 4B:
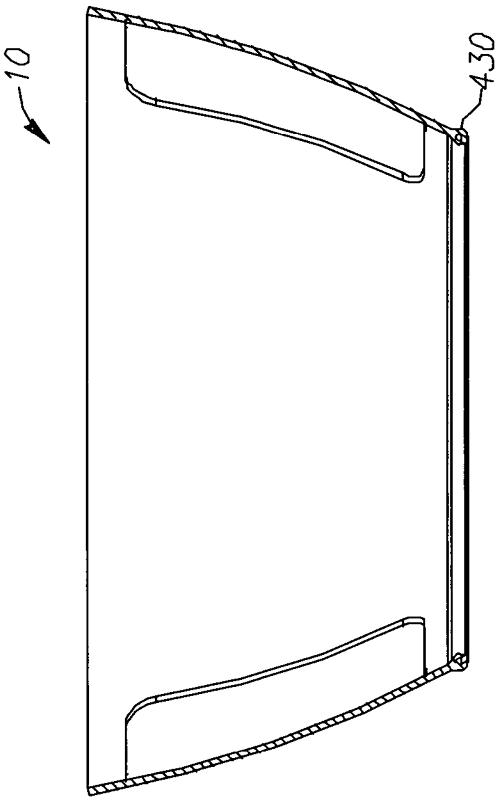
FIGS. 4*a* and 4*b* illustrate another embodiment of the present invention wherein the collecting bowl has an integrated sealing component, according to an embodiment of the subject matter.
Figure 4A:
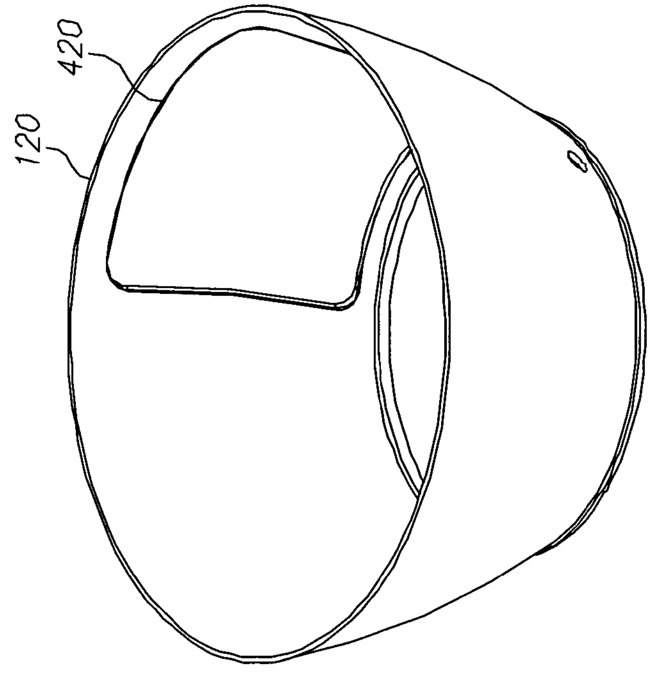

Reference is made to FIG. 4*a* and FIG. 4*b*, illustrating another embodiment of the present invention wherein the collecting bowl (120) has an integrated sealing mechanism (405), according to which, when the frames of the filters located on the malaxation bowl are attached to the sealing mechanism (420), the filters are blocked and cannot transfer liquid between the bowls. Such attachment may be achieved during the rotation of the collecting bowl (120) while the malaxation bowl (100) remains static. Both bowls are connected at the bottom, sealed by a lip-seal or any of numerous existing sealing methods (430) as illustrated in FIG. 4*b*.

Figure 5B:
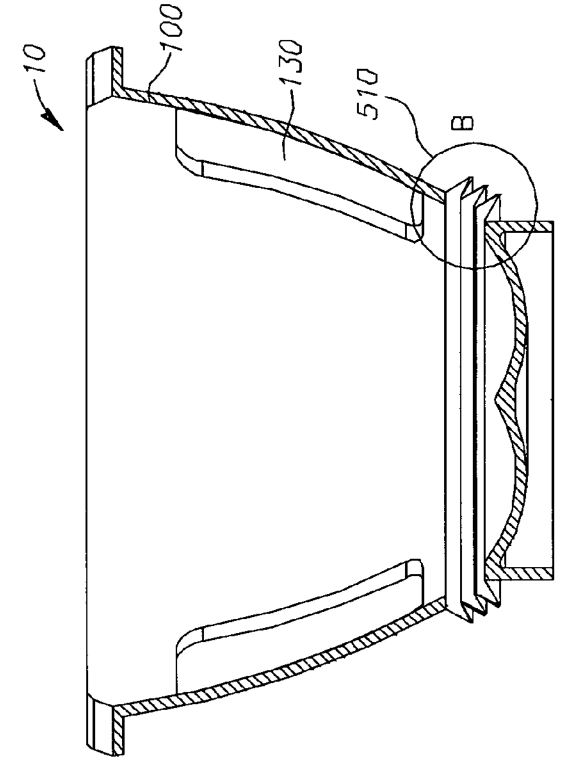
FIGS. 5*a*, 5*b* and 5*c* illustrate yet another embodiment of the present invention according to which the malaxation bowl having an elastic mechanism, according to an embodiment of the subject matter.
Figure 5C:
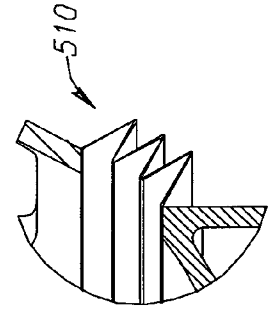
Figure 5A:
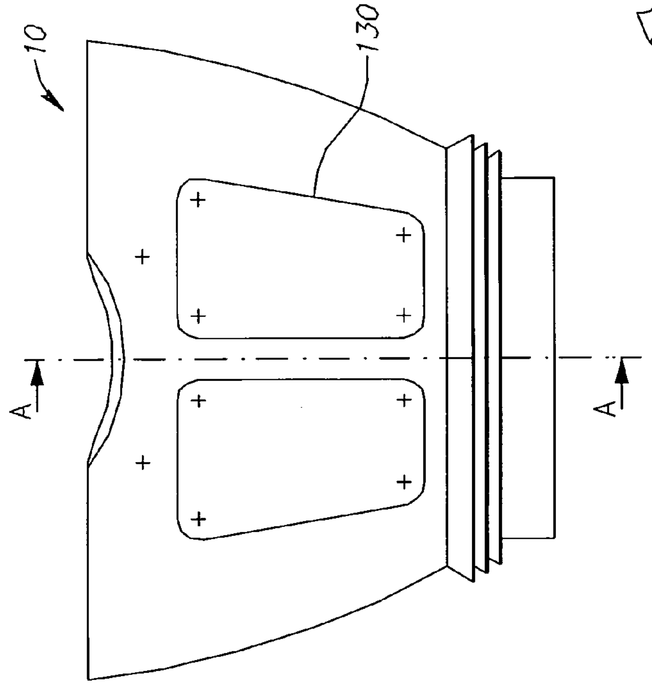

Reference is made to FIGS. 5*a*, 5*b*, 5*c*, illustrating yet another embodiment of the present invention wherein the oil extracting device (10) consists of a malaxation bowl (100) with integrated one or more filters (130). In some embodiments of the present invention, it is preferred to control the height of the filters for obtaining high extraction percentages of olive oil, yet leaving behind all the layers of vegetable water and sediment as described previously. A bellows mechanism (510) allows a change in elevation of the malaxation bowl (100) which results in a height change of the one or more filters (130). The bellows mechanism (510) as magnified in FIG. 5*c* may be raised manually or automatically by mechanical means. Alternatively, it is also possible to employ elastomeric material which allows to be stretched up to an optimal point.

Another embodiment includes a flexible elastomeric surface at the bottom of the malaxation bowl (100). Inflation or deflation of the volume beneath this surface raises or lowers the surface of the olive paste within the malaxation bowl (100) respectively and changes the relative height between the level of olive paste and the one or more filters (130) as desired in order to optimize the flow from the malaxation bowl (100) to the collection bowl (120).

One technical effect of the subject matter is to allow extraction of olive oil without external devices, solely a container and a crushing device, using preprocessed locations of the one or more filters. That way, no human or mechanical effort is required to produce oil from crushed olives and no energy is consumed. In some solutions, the walls of the malaxation bowl are replaceable to allow different walls to be used, having different heights of the one or more filters (130). Another technical effect of the subject matter is to allow home users to produce olive oil, since the size and costs of the device are affordable for home users as well.

It should be appreciated that the above described methods and devices may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

We claim as follows:

1. A device for extracting olive oil, comprising:

a crushing device for crushing olives to obtain olive paste;

a malaxation bowl for malaxation of said olive paste, the malaxation bowl having a wall and at least one opening located in said wall;

at least one filter located within said at least one opening for separating solids from liquids, and a collecting bowl configured for collecting malaxation liquids and into which said malaxation bowl is inserted, such that said malaxation bowl is located within said collecting bowl and such that oil flowing through said at least one filter is collected within said collection howl, said collection bowl comprises an exiting spout having an inner opening, said inner opening being positioned at the height of said oil achieved after at least a portion of said malaxation, the malaxation liquids comprising oil and non-oil fluids, wherein said exiting spout is positioned so as to enable said oil to exit from said collecting bowl while leaving said sediments and unwanted liquids created within said collecting bowl below said exiting spout.

2. The device of claim 1 wherein the at least one filter is made of a material selected from the group consisting of stainless steel, polymer mesh and a combination thereof, the filter being configured for allowing liquids to pass through while holding back solids.

3. The device of claim 1 wherein the at least one filter is located at a predetermined height on said wall so as to allow oil to flow through said filter while preventing flow of said non-oil fluids, said is predetermined as a function of parameters including size of the malaxation bowl and quantity and cultivar of said olives.

4. The device of claim 1 further comprising a barrier configured to temporarily prevent passage of malaxation liquids through the at least one filter.

5. The device of claim 1 wherein the malaxation bowl is positioned at least partially inside said collecting bowl and wherein the device further comprises means for adjusting relative position of said collecting bowl with respect to the malaxation bowl.

6. The device of claim 1 wherein the collecting bowl has a volume for maintaining sediments.

7. The device of claim 1 wherein the collecting bowl comprises a spout having an inner opening for allowing passage of liquids from said collecting bowl to a receiving container, and Wherein said inner opening is positioned at a predetermined height so as to allow oil to flow through said inner opening while preventing flow of non-oil fluids, said height is predetermined as a function of parameters including size of the malaxation bowl and quantity and cultivar of said olives.

8. The device of claim 1 wherein the collecting bowl comprises a spout having an inner opening for allowing passage of liquids from said collecting bowl to the receiving container and wherein said spout comprises a means for regulating said inner opening so as to allow oil to flow through said inner opening while preventing flow of non-oil fluids.

9. The device of claim 8 wherein said means for regulating said inner opening comprises a valve and a valve core located adjacent to the collecting bowl and having a hollow cylinder having a longitudinal cut substantially across the length oldie valve core.

10. The device of claim 1 wherein the at least one filter comprises a filter body and a frame for supporting the filter body.

11. The device of claim 10 wherein the filter body further comprises an element for attaching a barrier for enabling partial blockage of liquid flow exiting the malaxation bowl.

12. The device of claim 1 wherein the at least one filter is detachable.

13. The device of claim 5 wherein the malaxation bowl further comprises external circumference sockets compatible in size, shape and position to inner circumference protrusions integrated as part of the inner surface of the collecting bowl.

14. The device of claim 5 further comprising at least one barrier attached to said malaxation bowl and configured to enable at least partial blockage of an oil flow from said malaxation bowl into said collecting bowl.

15. A method for extracting olive oil, the method comprising the steps of:

crushing olives to obtain olive paste;

malaxating the olive paste in a malaxation bowl, the malaxation bowl comprising a will and at least one filter located in said wall configured for separating solids from liquids;

obtaining the filter at a height such that oil flowing through at least one filter is collected within a collection bowl, said collection bowl comprises an exiting spout having an inner opening, said inner opening being positioned at the height of oil achieved after at least a portion of the olive paste is malaxated, wherein malaxation of the olive paste produces malaxated liquids comprising oil and non-oil fluids;

collecting said liquids flowing through said at least one filter into a collecting bowl; and regulating flow of said liquids from said collecting bowl to a receiving container so as to allow oil to flow into said receiver container while preventing flow of non-oil fluids.

16. The method according to claim 15 further comprising limiting the flow of liquids through the at least one filter by introduction of a barrier partially blocking said at least one filter thereby regulating said flow of liquids from said malaxation bowl to said collecting bowl.

17. The method according to claim 15 wherein the at least one filter is located at a predetermined height on a side wall of the malaxation bowl so as to allow oil to flow through said filter while preventing flow of non-oil fluids, said height is predetermined as a function of parameters including size of the malaxation bowl and quantity and cultivar of said olives.

18. The device of claim 1 further comprises a mechanical track for allowing the movement of the exiting spout on a vertical axis to different levels allowing extraction of a maximum amount of oil without sediment for each cultivate of olives.

* * * * *